(12) United States Patent
Hayashi et al.

(10) Patent No.: US 9,605,985 B2
(45) Date of Patent: Mar. 28, 2017

(54) FLOW RATE MEASURING MECHANISM, MASS FLOW CONTROLLER, AND PRESSURE SENSOR

(75) Inventors: Shigeyuki Hayashi, Kyoto (JP); Akira Kuwahara, Kyoto (JP)

(73) Assignee: HORIBA STEC, Co., Ltd., Kyoto-shi (JP)

( * ) Notice: Subject to any disclaimer, the term of this patent is extended or adjusted under 35 U.S.C. 154(b) by 668 days.

(21) Appl. No.: 13/499,671

(22) PCT Filed: Sep. 17, 2010

(86) PCT No.: PCT/JP2010/066189
§ 371 (c)(1),
(2), (4) Date: Mar. 30, 2012

(87) PCT Pub. No.: WO2011/040270
PCT Pub. Date: Apr. 7, 2011

(65) Prior Publication Data
US 2012/0180876 A1 Jul. 19, 2012

(30) Foreign Application Priority Data
Oct. 1, 2009 (JP) .................. 2009-229268

(51) Int. Cl.
*G01F 1/36* (2006.01)
*G01F 1/88* (2006.01)
*G05D 7/06* (2006.01)

(52) U.S. Cl.
CPC .............. *G01F 1/36* (2013.01); *G01F 1/88* (2013.01); *G05D 7/0635* (2013.01); *Y10T 137/7759* (2015.04)

(58) Field of Classification Search
CPC .. G01F 1/36; G01F 1/6847; G01F 1/88; F01L 13/025; G05D 7/0635

(Continued)

(56) References Cited

U.S. PATENT DOCUMENTS 4,315,523 A * 2/1982 Mahawili .................. G01F 3/20
137/487.5
6,116,282 A * 9/2000 Yamaji .................. F16K 27/003
137/613

(Continued)

FOREIGN PATENT DOCUMENTS

CN 101258351 A 9/2008
JP 2-55123 U 4/1990

(Continued)

OTHER PUBLICATIONS

ISA Japan, International Search Report of PCT/JP2010/066189, Nov. 30, 2010, WIPO, 1 page.

(Continued)

*Primary Examiner* — Michael R Reid
(74) *Attorney, Agent, or Firm* — Alleman Hall McCoy Russell & Tuttle LLP

(57) ABSTRACT

The present invention is a flow rate measuring mechanism provided with: a body unit that has an internal flow path through which a target fluid to be measured is configured to flow; and a pressure sensor that is attached to the body unit and senses a pressure of the internal flow path, and configured to calculate a flow rate of the fluid on the basis of the fluid pressure sensed by the pressure sensor, wherein the body unit has a length direction and a surface parallel to the length direction, which is set as a component attachment surface, and to the component attachment surface, the pressure sensor is attached such that a pressure sensitive surface thereof is substantially vertical to the component attachment surface and substantially parallel to the length direction, and thereby, without causing a reduction in pressure measurement sensitivity, makes a width direction size dramatically smaller than before.

5 Claims, 7 Drawing Sheets

(58) Field of Classification Search
USPC ................ 137/487.5, 485, 487, 486; 73/202, 73/861.52, 715, 716, 721, 727, 736
See application file for complete search history.

(56) References Cited

U.S. PATENT DOCUMENTS

| | | | |
|---|---|---|---|
| 6,186,177 B1* | 2/2001 | Maher | F17D 1/04 137/613 |
| 6,273,139 B1* | 8/2001 | Ohmi | F16K 27/003 137/884 |
| 6,539,968 B1* | 4/2003 | White et al. | 137/10 |
| 6,840,112 B2 | 1/2005 | Ikeda | |
| 2004/0129084 A1 | 7/2004 | Ikeda | |
| 2007/0205384 A1 | 9/2007 | Kurosawa | |

FOREIGN PATENT DOCUMENTS

| | | |
|---|---|---|
| JP | H0255123 U | 4/1990 |
| JP | 10-311768 A | 11/1998 |
| JP | 2004-212220 A | 7/2004 |
| JP | 2007-265395 A | 10/2007 |
| TW | 200736872 A | 10/2007 |
| WO | 2007008692 A2 | 1/2007 |

OTHER PUBLICATIONS

Intellectual Property Office of Taiwan, First Office Action Issued in Taiwanese Patent Application No. 099132624, Sep. 15, 2014, 6 pages.

\* cited by examiner

PRIOR ART

FLOW RATE MEASURING MECHANISM, MASS FLOW CONTROLLER, AND PRESSURE SENSOR

TECHNICAL FIELD

The present invention relates to a mass flow controller that controls a flow rate of material gas or the like used in a semiconductor process, and to a flow rate measuring mechanism and a pressure sensor used for the mass flow controller.

BACKGROUND ART

As a pressure sensor used for this sort of flow rate measuring mechanism or mass flow controller, as disclosed in Patent Literature 1, there is known a sensor that receives pressure of fluid with a pressure sensitive surface provided on a diaphragm or the like, and, on the basis of a displacement of the pressure sensitive surface, measures a value of the fluid pressure. In the pressure sensor based on such a system, as an area of the pressure sensitive surface in a pressure receiving member is increased, sensitivity is improved.

Meanwhile, conventional mass flow controllers include one having a configuration in which a pressure sensor, a flow rate control valve, and the like are attached to a body inside which a flow path through which fluid to be controlled flows is formed. In particular, in recent years, at the request of compactly arranging a plurality of mass flow controllers in parallel, or other request, as illustrated in FIG. 10, there has been developed a mass flow controller 100' of which a body 1' is formed in an elongated shape, and a component attachment surface 1c' set for one surface parallel to a length direction of the body 1' is attached with pressure sensors 2', flow rate control valve 4', and the like in series along the length direction to thereby keep a width direction size of the whole of the mass flow controller small.

CITATION LIST

Patent Literature

Patent literature 1: Japanese Published Unexamined Utility Model Application No. H02-55123

SUMMARY OF THE INVENTION

Technical Problem

However, in the conventional mass flow controller, the pressure sensors are arranged with pressure sensitive surfaces thereof being parallel to the component attachment surface of the body, and therefore in the case of attempting to further reduce the width direction size of the whole, the area of each of the pressure sensitive surfaces is reduced, which may cause a reduction in sensitivity. Also, this acts as a bottleneck to downsizing, in particular, the reduction in the width direction.

The present invention is made in consideration of the above problem, and is intended to provide a pressure sensor, a flow rate measuring mechanism, or a mass flow controller that can, without causing a reduction in pressure measurement sensitivity, make the width direction size dramatically smaller than before.

Solution to Problem

That is, a flow rate measuring mechanism according to the present invention is provided with: a body unit that has an internal flow path through which a target fluid to be measured is configured to flow; a fluid resistance member is separating the internal flow path and has a resistance flow path that communicatively connects an upstream side internal flow path upstream of the resistance member and a downstream side flow path downstream of the resistance member; and a pressure sensor that is attached to the body unit and senses a pressure of at least one of the upstream side internal flow path and the downstream side internal flow path, the flow rate measuring mechanism being configured to calculate a flow rate of the fluid on the basis of the fluid pressure sensed by the pressure sensor, wherein: the body unit has a length direction (longer direction) and a surface parallel to the length direction, the surface being set as a component attachment surface; and to the component attachment surface, the pressure sensor is attached such that a pressure sensitive surface thereof is substantially vertical to the component attachment surface and substantially parallel to the length direction.

If so, with the pressure sensitive surface of the pressure sensor being increased in size to improve pressure sensitivity characteristics, a width direction size, that is, a size that is orthogonal to the length direction and parallel to the component attachment surface, can be dramatically decreased. Also, this enables a plurality of flow rate measuring mechanism to be compactly arranged in parallel.

Also, if the flow rate measuring mechanism is configured such that, in the fluid resistance member, a communicative connection path is formed by penetrating through the fluid resistance member; between the body unit and the pressure sensor, the fluid resistance member is placed; and in this placement state, the upstream side internal flow path and a pressure introduction port provided in the pressure sensor are communicatively connected to each other through the communicative connection path, the pressure sensor is arranged by being stacked on the fluid resistance member, and therefore the body unit can be prevented from being unnecessarily elongated. Further, if so, the pressure sensor and the fluid resistance member is arranged on the same side of the body unit in a stacking manner, and therefore an internal flow path length between them can be shortened as much as possible. Accordingly, flow rate sensing responsiveness can be improved.

If the flow rate measuring mechanism is configured such that, by attaching the pressure sensor to the body unit, the fluid resistance member is sandwiched and held between them, the pressure sensor directly plays a role as an attachment tool for attaching the fluid resistance member to the body unit, and therefore the number of components can be reduced.

Specific aspects that can provide more compactness and preferably provide sealing or the like include an aspect adapted to: on an outer surface of the body unit, open a concave portion having a side or bottom surface on which the upstream side internal flow path and downstream side flow path are opened; in the concave portion, contain the fluid resistance member and attach the pressure sensor to the body unit; and thereby seal the opening of the concave portion with an attachment surface of the pressure sensor to hold the fluid resistance member.

To utilize the flow rate measuring mechanism to form a mass flow controller, it is necessary to provide a flow rate control valve that is attached to the body unit, and a control circuit that controls the flow rate control valve so as to make a measured flow rate by the flow rate measuring mechanism equal to a predetermined target flow rate.

As the pressure sensor, a pressure sensor provided with a main body member of which a predetermined one surface is set as an attachment surface, the main body member being formed inside with a pressure sensitive surface that senses a pressure of the fluid to be measured, wherein the pressure sensitive surface is configured to be substantially vertical to the attachment surface can be sited.

More specifically, preferably, the main body member is formed in a flattened shape; one surface vertical to a flattened surface of the main body member is set as the attachment surface; and the pressure sensitive surface is provided substantially parallel to the flattened surface.

Also, a pressure sensor provided with: a pressure introduction port for introducing a target fluid to be measured; a fluid filling chamber that is filled with the fluid; and a main body member that has a fluid introduction path that communicatively connects the fluid filling chamber and the pressure introduction port, the fluid filling chamber having one surface that is set as a pressure sensitive surface for sensing a pressure, wherein an opening site of the fluid introduction path with respect to the fluid filling chamber is set to be a side surface site that is substantially vertical to the pressure sensitive surface, or the fluid introduction path is formed parallel to or oblique to the pressure sensitive surface can also preferably solve the problem of the present invention.

Advantageous Effects of Invention

According to the present invention, with a pressure sensitive surface of a pressure sensor being increased in size to improve pressure sensitivity characteristics, a width direction size, that is, a size that is orthogonal to a length direction and parallel to a component attachment surface can be dramatically decreased.

REFERENCE CHARACTERS LIST

Figure 1:
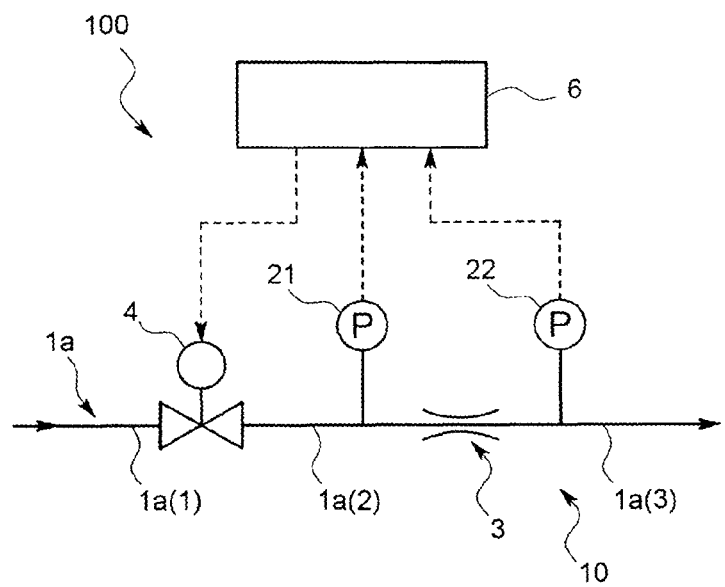
FIG. 1 is a fluid circuit diagram of a mass flow controller in one embodiment of the present invention.

100: Mass flow controller
10: Flow rate measuring mechanism
1: Body unit
1a: Internal flow path
1a (2): Upstream side internal flow path
1a (3): Downstream side internal flow path
1c: Component attachment surface
21, 22: Pressure sensor
2a1: Pressure introduction port
2b1: Pressure sensitive surface
3: Fluid resistance member
3a: Resistance flow path
3c: Communicative connection path
4: Flow rate control valve
6: Control circuit

DESCRIPTION OF THE EMBODIMENTS

In the following, one embodiment of the present invention is described with reference to the drawings.

Figure 2:
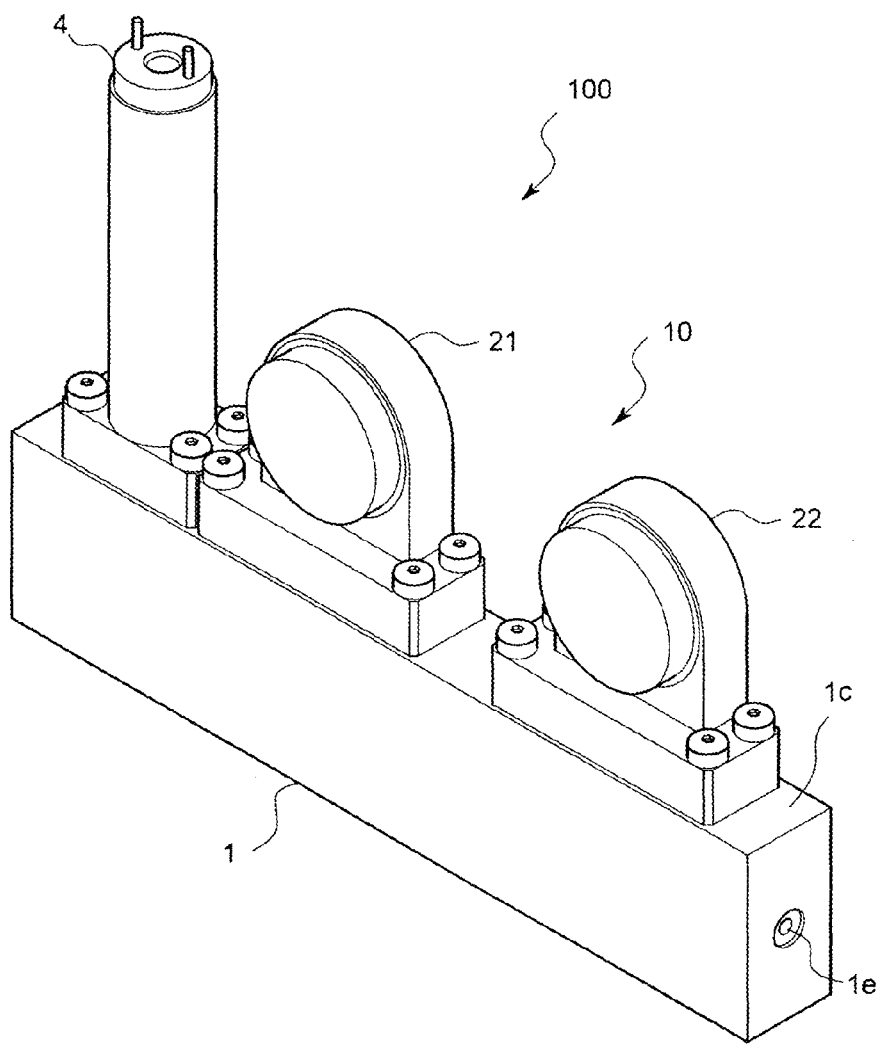
FIG. 2 is an overall perspective view of the mass flow controller in the same embodiment.

A mass flow controller 100 according to the present embodiment is, for example, one that is mounted on a gas panel to constitute a part of a material supply line of a semiconductor manufacturing device, and, as illustrated in a fluid circuit diagram of FIG. 1 and an overall perspective view of FIG. 2, is configured to have: a body unit 1 that has an internal flow path 1a through which fluid acting as a flow rate control target flows; a flow rate control valve 4 that is provided on the internal flow path 1a; a flow rate measuring mechanism 10 that is provided on a downstream side of the flow rate control valve 4 and measures a mass flow rate of the fluid flowing through the internal flow path 1a; and a control circuit 6 (not illustrated in FIG. 2) that controls the flow rate control valve 4 so as to make a measured flow rate by the flow rate measuring mechanism 10 equal to a predetermined target flow rate. The respective parts are described below in detail.

The body unit 1 is, as illustrated in FIG. 2, formed in an elongate rectangular parallelepiped shape. One surface parallel to a length direction in the body unit 1 is set as a component attachment surface 1c, and only the component attachment surface 1c is configured to be attached with components such as the flow rate control valve 4, pressure sensors 21 and 22, and the like. Also, a surface on a side opposite to the attachment surface 1c is set as a fixation surface for fixing the body unit 1 to a panel or the like. Further, the other two surfaces (hereinafter referred to as side surfaces) parallel to the length direction are configured not to be attached with anything such that side surfaces of a plurality of body units 2 can be arranged as being in close contact with or close to each other.

Figure 3:
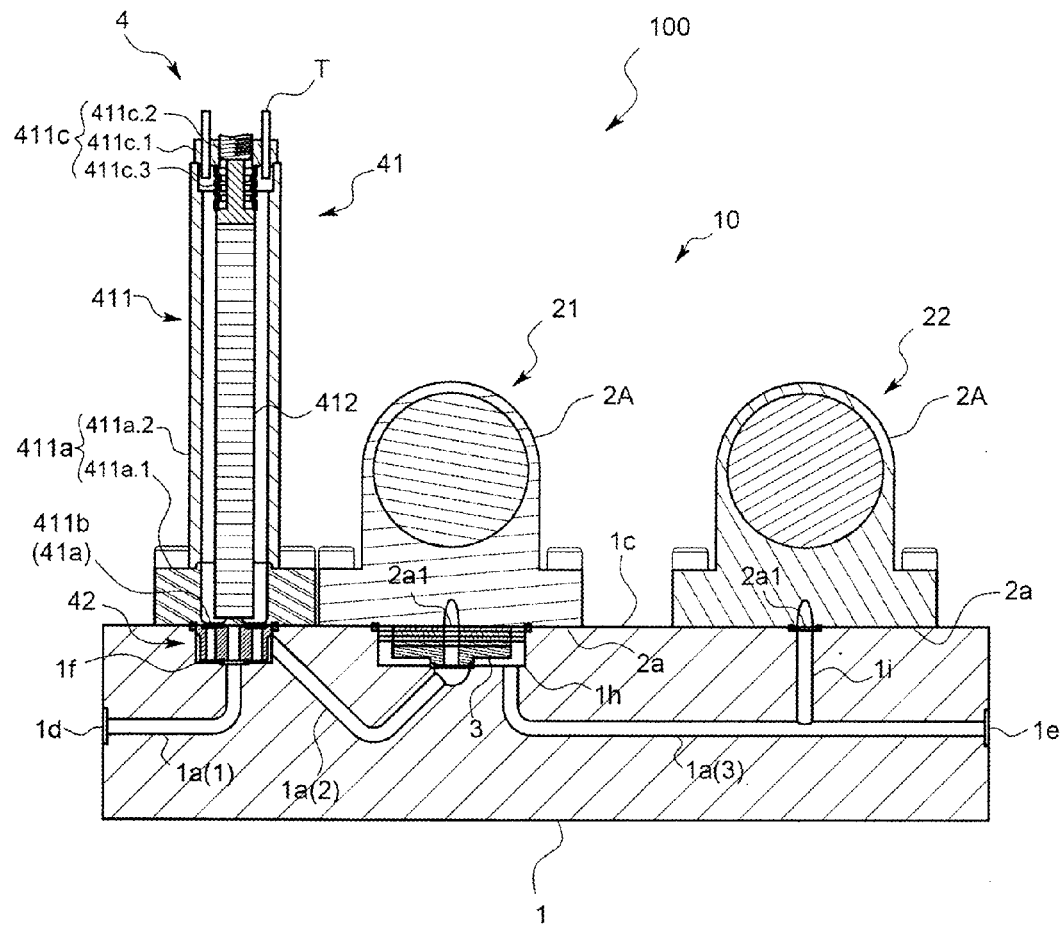
FIG. 3 is a vertical cross-sectional view illustrating an internal structure of the mass flow controller in the same embodiment.

The internal flow path 1a extends from one end part to the other end part of the body unit 1 in the length direction, and is, more specifically, as illustrated in FIG. 3, configured such that a fluid introduction port 1d and a fluid lead-out port 1e thereof are respectively opened on both end surfaces orthogonal to the length direction of the body unit 1. Also, as viewed from a direction orthogonal to the component attachment surface 1c (hereinafter also referred to as a plan view), the internal flow path 1a is configured such that the fluid flows substantially parallel to the length direction.

Figure 4:
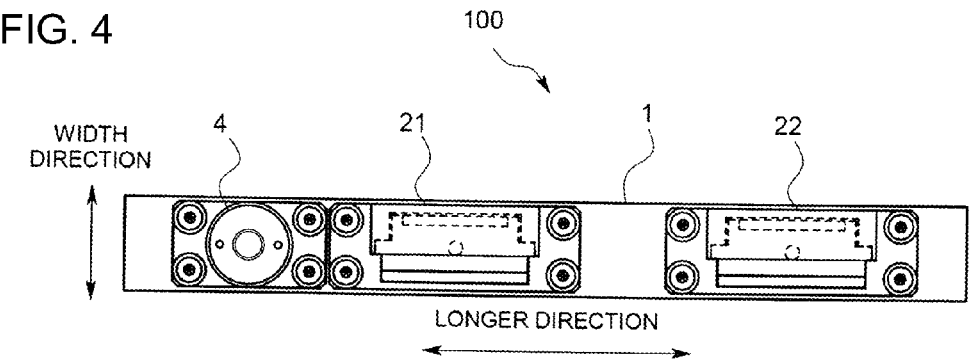
FIG. 4 is a plan view of the mass flow controller in the same embodiment.
Figure 6:
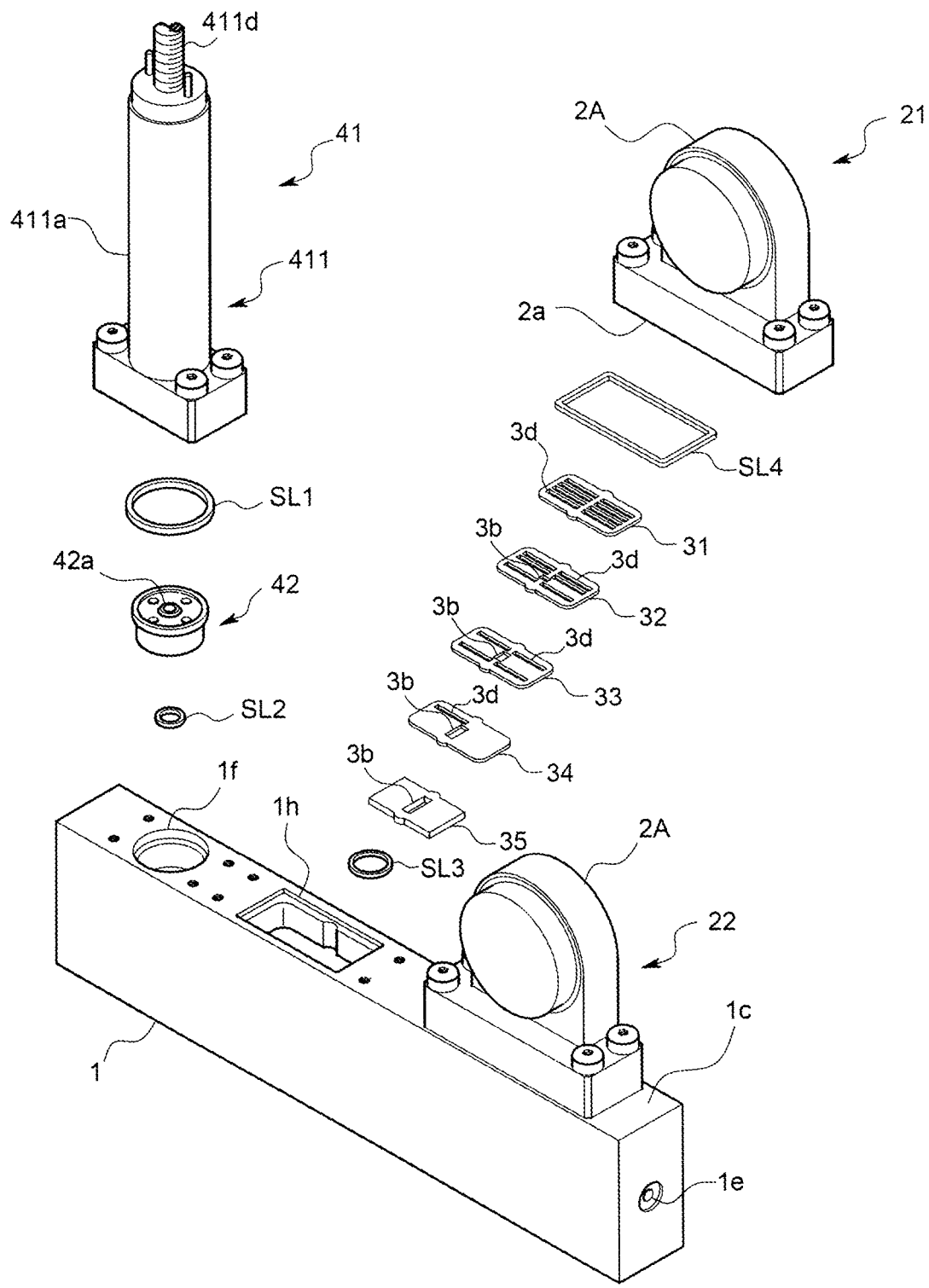
FIG. 6 is an exploded perspective view of the mass flow controller in the same embodiment.
Figure 7:
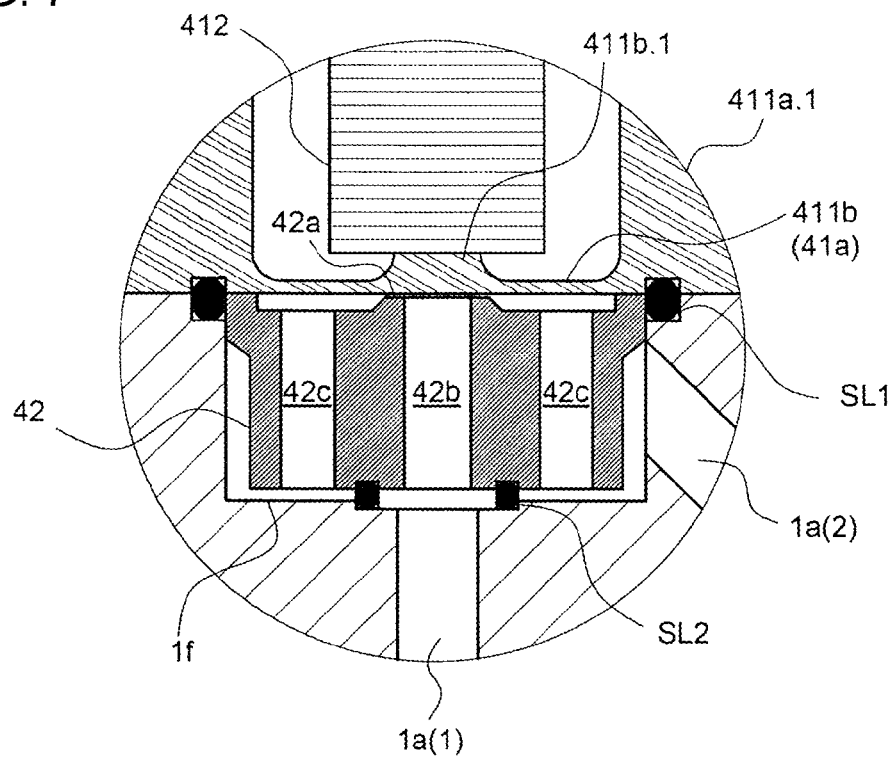
FIG. 7 is a partial cross-sectional view illustrating an internal structure of a flow rate control valve in the same embodiment.

The flow rate control valve 4 is, as illustrated in FIGS. 3, 6, and 7, formed in a columnar shape including a valve seat member 42 and a valve element member 41, and vertically attached to one end part on the fluid introduction port 1d side of the component attachment surface 1c. A maximum width size of the flow rate control valve 4 is set to be smaller than or the same as a width size (a size in a direction orthogonal to the length direction) of the component attachment surface 1c, and as illustrated in FIG. 4, configured such that in a state where the flow rate control valve 4 is attached to the body unit 1, the flow rate control valve 4 does not protrude in a width direction from the body unit 1.

Among members constituting the flow rate control valve 4, the valve seat member 42 is, as illustrated in FIGS. 6 and 7 and other drawings, formed in a substantially columnar shape having an annular seating surface 42a that is formed in a top surface central part thereof with protruding. Also, the valve seat member 42 includes: a fluid introduction path 42b of which one end is opened in the top surface central part of the valve seat member 42 (specifically, inside the valve seating surface 42a) and the other end is opened in a bottom surface central part of the valve seat member 42; and a fluid lead-out path 42c of which one end is opened in a top surface outer edge of the valve seat member 42 (more specifically, outside of the valve seating surface 42a) and the other end is opened in a bottom surface outer edge of the valve seat member 42, both of which penetrate therethrough.

The valve seat member 42 is fitted into a bottom-equipped concave portion 1f that is opened in the one end part of the component attachment surface 1c. The bottom-equipped concave portion 1f is provided at a position at which the internal flow path 1a is separated. Specifically, in a bottom surface central part of the bottom-equipped concave portion 1f, an end point of an upstream side internal flow path 1a (1) of the separated internal flow path 1a is opened, and on a bottom part side peripheral surface of the bottom-equipped concave portion 1f, a start point of a downstream side internal flow path 1a (2) is opened.

Thus, based on this configuration, in a state where the valve seat member 42 is fitted into the bottom-equipped concave portion 1f, the other end of the fluid introduction path 42b is communicatively connected to the end point of the upstream side internal flow path 1a (1) opened in the center of the bottom-equipped concave portion 1f through a seal member SL2, and also the other end of the fluid lead-out path 42c is communicatively connected to the start point of the downstream side internal flow path 1a (2) because from the bottom surface outer edge to a side peripheral surface bottom part of the valve seat member 42, there is a gap with an inner peripheral surface of the bottom-equipped concave portion 1f.

Figure 8:
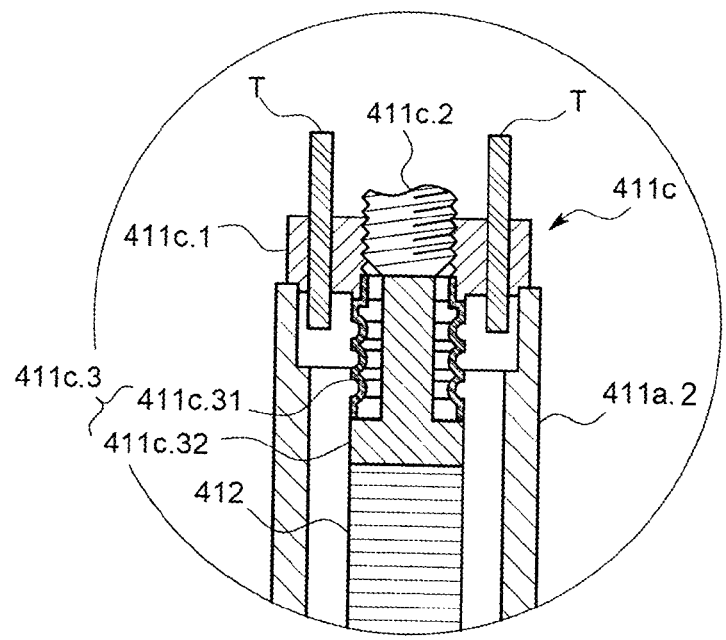
FIG. 8 is a partial cross-sectional view illustrating the internal structure of the flow rate control valve in the same embodiment.

On the other hand, the valve element member 41 is, as illustrated in FIGS. 3, 7, and 8, provided with: a casing 411 that is configured to bring an inside thereof into an airtight state; and a stacked piezoelectric element 412 that is contained in the casing 411 and formed in a columnar shape.

The casing 411 is provided with: a long tubular housing 411a; an elastically deformable thin plate-like diaphragm member 411b that blocks one end surface of the housing 411a in an airtight manner; and a blocking member 411c that blocks the other end surface of the housing 411a in an airtight manner.

The housing 411a includes: a blockish one end side element 411a.1 that is attached to the component attachment surface 1c so as to cover the bottom-equipped concave portion 1f; and a cylindrical other end side element 411a.2 that is connected to the one end side element 411a.1.

The diaphragm member 411b is, as illustrated in FIG. 7, an elastically deformable thin plate having, in the center, a protrusion 411b.1 that protrudes inward, and formed integrally with the one end side element 411a.1.

The blocking member 411c is, as illustrated in FIG. 8, provided with: a disc-like member main body 411c.1 that is attached so as to block the other end surface of the housing 411a; an adjustment screw 411c.2 that is screwed into a female screw hole penetrating through the center of the member main body 411c.1 and moves forward and backward; and an airtight holding member 411c.3 that is attached to an inner surface of the member main body 411c.1 so as to surround a screw thread portion. Note that the member main body 411c.c has terminals T for driving the piezoelectric element, which penetrate therethrough in an airtight manner, and therefore has a so-called hermetic structure. The airtightness holding member 411c.3 includes: a tubular bellows part 411c.31 that elastically expands and contracts in an axial direction; and a columnar member 411c.32 that is joined to a bottom part of the bellows part 411c.31 in an airtight manner.

The columnar part 411c.32 is one that intervenes between the adjustment screw 411c.2 and the stacked piezoelectric element 412, and the stacked piezo electric element 412 is configured such that, by screwing the adjustment screw 411c.2 forward or backward, a position thereof in the axial direction can be adjusted through the columnar member 411c.32. In addition, a fore end surface of the columnar member 411c.32 and a base end surface of the stacked piezoelectric element 412 adhere to each other.

By attaching the one end surface of the housing 411a to the component attachment surface 1c of the body unit 1 through the seal member SL1, the opening of the bottom-equipped concave portion 1f formed in the body unit 1 is sealed by the one end surface, and the diaphragm member 411b is made to face to the valve seating surface 42a; and a separation distance between the diaphragm member 411b and the valve seating surface 42a is changed by expansion or contraction of the piezoelectric element 412, and thereby the diaphragm member 411b is adapted to function as the valve element 41a.

The flow rate measuring mechanism 10 is, in terms of a fluid circuit, as illustrated in FIG. 1, adapted to include: a resistance flow path 3a that is provided on the internal flow path 1a; and a pair of pressure sensors 21 and 22 that measure fluid pressures in the internal flow path 1a on upstream and downstream sides of the resistance flow path 3a, respectively. The flow rate measuring mechanism 10 is configured to be able to, on the basis of pressure measurement values by the pressure sensors 21 and 22 and a resistance value of the resistance flow path 3a, measure a flow rate of the fluid flowing through the internal flow path 1a.

Figure 9:
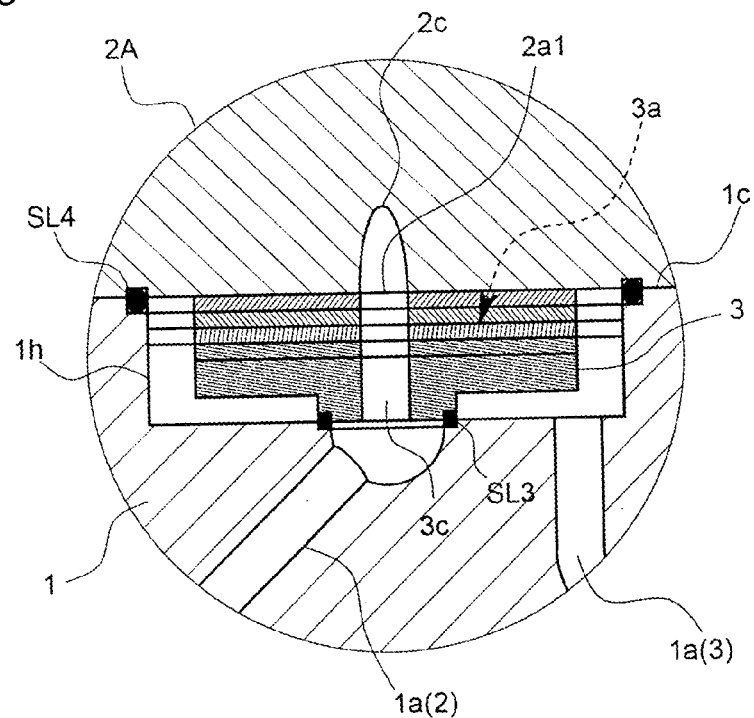
FIG. 9 is a partial cross-sectional view illustrating an internal structure in a state where a fluid resistance member in the same embodiment is contained in a concave portion.
Figure 10:
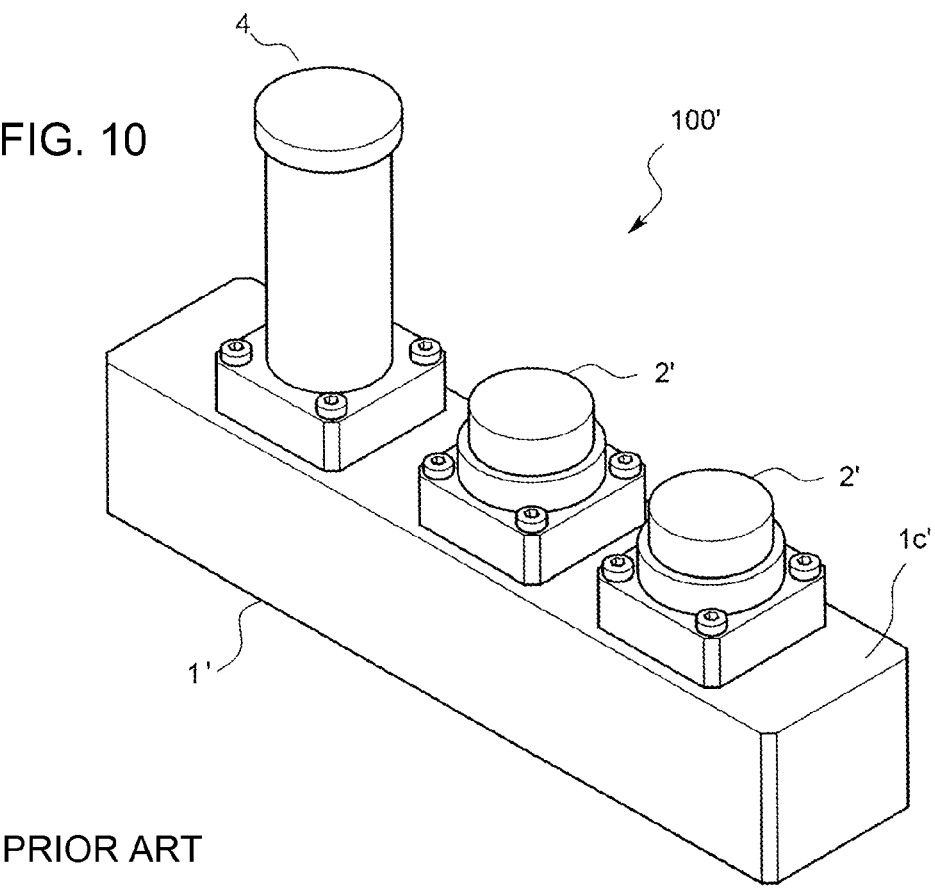
FIG. 10 is an overall perspective view illustrating a conventional mass flow controller.

The resistance flow path 3a is, as illustrated in FIGS. 6 and 9, formed in a rectangle parallelepiped fluid resistance member 3 stacked with a plurality of rectangular thin plates 31 to 35. That is, as illustrated in FIG. 6, each or part of the thin plates is provided with: a through-hole 3b serving as a communicative connection path 3c that, when the thin plates are stacked, overlaps with other thin plates to penetrate in a stacking direction; and a slit 3d of which an inner end is communicatively connected to the communicative connection path 3c and an outer end is opened on a side surface orthogonal to the length direction, and when the thin plates 31 to 35 are stacked, the resistance flow path 3a is formed by the slits 3d. Note that, by changing shapes or the number of the slits 3d, the fluid resistance value can be controlled.

On the other hand, in a length direction central part in the component attachment surface 1c of the body unit 1, as illustrated in FIGS. 3, 5, 6, and 9, a rectangular concave portion 1h is provided so as to separate the internal flow path 1a. The fluid resistance member 3 is designed to be fitted into the concave portion 1h without gap in the width direction but with having a gap in the length direction of the body unit 1. Also, the concave portion 1h is configured such that in a bottom surface central part of the concave portion 1h, an end point of an upstream side internal flow path 1a (2) of the internal flow path 1a separated by the concave portion 1h opens, and in a length direction bottom surface edge in the bottom-equipped concave portion 1f, a start point of a downstream side internal flow path 1a (3) opens.

In a state where the fluid resistance member 3 is fitted into the concave portion 1h, one end on a bottom side of the communicative connection path 3c is connected to the end point of the upstream side internal flow path 1a (2) through the seal member SL3, and an outer end of the resistance flow path 3a is communicatively connected to the start point of the downstream side internal flow path 1a (3). That is, the upstream side internal flow path 1a (2) is connected to the downstream side internal flow path 1a (3) through the communicative connection path 3c and the resistance flow path 3a.

Each of the pressure sensors 21 and 22 is, as illustrated in FIGS. 2 to 6 and other drawings, provided with: a main body member 2A formed in a flattened shape; and a pressure sensing element 2B incorporated in the main body member 2A. The flattened main body member 2A is attached to the component attachment surface 1c such that a face plate part thereof (flattened face) is vertical to the component attachment surface 1c and substantially parallel to the length direction of the body unit 1, that is, substantially parallel to a flow direction of the fluid in the plan view. Also, a thickness size of each of the pressure sensors 21 and 22 is, as illustrated in FIG. 4 and other drawings, set to be smaller than or the same as the width direction size of the component attachment surface 1c, and each of the pressure sensors 21 and 22 is configured not to protrude from the body unit 1 in the width direction in an attached state.

Figure 5:
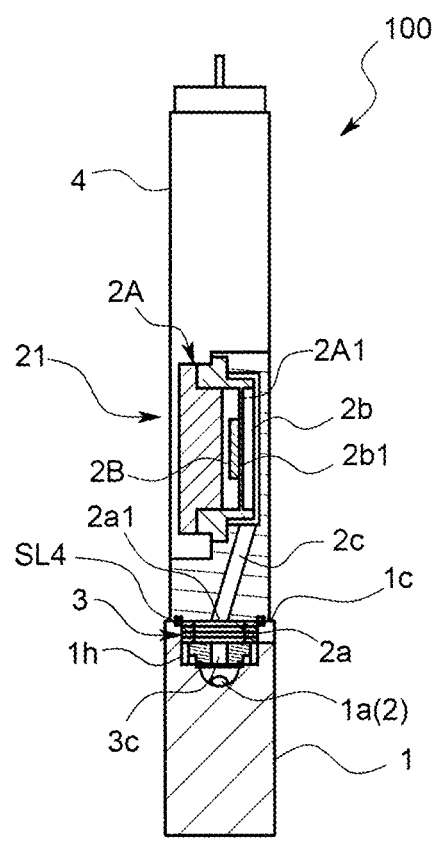
FIG. 5 is a transverse cross-sectional view illustrating an internal structure of a pressure sensor in the same embodiment.

In the main body member 2A, as illustrated in FIG. 5, a thin disc-like fluid filling chamber 2b formed with use of a diaphragm wall 2A1 that elastically deforms one surface 2b1 parallel to the face plate part; and a fluid introduction path 2c that communicatively connects the fluid filling chamber 2b and a pressure introduction port 2a1 to each other are formed. The pressure introduction port 2a1 is opened on an attachment surface 2a attached to the body unit 1. The fluid introduction path 2c is opened on a side surface of the fluid filling chamber 2b, that is, on a surface vertical to the one surface 2b1, and an extending direction of the fluid introduction path 2c is set to be parallel to or slightly oblique to the one surface 2b1.

The pressure sensing element 2B is, for example, a piezoelectric element, and brought into contact with a back surface of the diaphragm wall 2A1. Also, the pressure sensing element 2B is configured to, when the one surface 2b1 serving as a pressure sensitive surface receives fluid pressure and is thereby displaced, sense an amount of the displacement and to output the amount as a pressure signal. Note that as the pressure sensing element, for example, an element that senses a capacitance change of a space associated with the change of the diaphragm wall as an electrical capacitance change is also possible.

Also, the upstream side pressure sensor 21 of the pair of pressure sensors 21 and 22 is adapted to be attached to the length direction central part in the component attachment surface 1c of the body unit 1, and the downstream side pressure sensor 22 is adapted to be attached to a length direction other end part in the component attachment surface 1c.

In particular, the upstream side pressure sensor 21 is configured such that, by attaching the upstream side pressure sensor 21 to the body unit 1, the attachment surface 2a thereof seals the opening of the concave portion 1h through an annular seal member SL4 in an airtight manner, and also presses and holds the fluid resistance member 3 in the concave portion 1h with a bottom surface of the concave portion 1h. This eliminates the need to seal the fluid resistance member 3 with a dedicated lid or the like, and thereby enables a reduction in the number of components and a simplification of assembling to be facilitated to reduce cost.

Also, in this state, the communicative connection path 3c in the fluid resistance member 3 is configured to be connected to the pressure introduction port 2a1 of the upstream side pressure sensor 21, and the internal flow path 1a (2) on the upstream side of the resistance flow path 3a is configured to be communicatively connected to the upstream side pressure sensor 21 through the communicative connection path 3c.

On the other hand, the internal flow path 1a (3) on the downstream side of the resistance flow path 3a is adapted to extend along the length direction of the body unit 1 to reach the fluid lead-out port 1e, and also by a branch flow path 1i formed by branching on the way, to be connected to the pressure introduction port 2a1 of the downstream side pressure sensor 22.

The control circuit 6 illustrated in FIG. 1 is provided, being separate from or incidental to the body unit 1, and configured to have a CPU, a memory, an I/O channel, an A/D converter, a D/A converter, and other analog or digital electric circuits. The CPU and other peripheral devices collaboratively operate according to a program stored in the memory, and thereby the control circuit 6 controls the flow rate control valve 4, and controls a fluid flow rate in the internal flow path 1a to an externally indicated setting flow rate. In the following, an outline of operation of the control circuit 6 is briefly described in combination of operational description of the mass flow controller.

Upon receipt of output signal values from the respective pressure sensors 21 and 22, the control circuit 6 calculates, from the output signal values, on the basis of a predetermined conversion equation taking into account an offset, a factor, and the like, pressures of the fluid on the upstream and downstream sides of the resistance flow path 3a. Then, on the basis of the pressures and a preliminarily measured fluid resistance value (resistance factor), fluid viscosity, and the like in the resistance flow path 3a, the control circuit 6 calculates a flow rate of the fluid flowing through the resistance flow path 3a.

On the other hand, when being given a setting flow rate from an operator or other external device, the control circuit 6 calculates a deviation between the setting flow rate and the calculated flow rate, and on the basis of the deviation, in order to bring the calculated flow rate close to the setting flow rate, outputs an instruction signal to the flow rate control valve 4 to expand or contract the stacked piezoelectric element 412. In this manner, the control circuit 6 varies a separation distance between the valve seating surface 42a and the valve element 41a to control a flow rate of the fluid flowing through the flow rate control valve 4, that is, through the internal flow path 1a.

Thus, according to the present embodiment configured as described, the pressure sensors 21 and 22 are configured such that the pressure sensitive surfaces 2b1 thereof rise vertically to the attachment surfaces 2a thereof, and attached in series to the component attachment surface 1c such that, in the plan view, the flow direction of the fluid and the pressure sensitive surfaces 2b1 are parallel to each other, so that the pressure sensors 21 and 22 can be formed in an elongate shape in the plan view with areas of the pressure sensitive surfaces 2b1 being kept large to keep high sensitivity and the width direction sizes being kept small.

Further, although the seal member intervenes between the fluid resistance member 3 and the pressure sensor 21, the both are arranged with being substantially directly stacked, so that the body unit 1 can be suppressed as much as possible from being elongated in the length direction, and even on this point, downsizing can be facilitated.

In addition, other associated effects include an effect of being able to reduce as much as possible a volume of the internal flow path 1a that makes a connection between the flow rate control valve 4 and the fluid resistance member 3 because these are arranged side by side on the component attachment surface in the body unit 1. Accordingly, a time lag between flow rate sensing and flow rate control can be reduced, and therefore control responsiveness of the mass flow controller 100 can be significantly improved.

Also, in terms of the flow rate control valve 4, the diaphragm member 411b is provided with both of a function as a sealing member for sealing the piezoelectric element 412 in the housing 411a in an airtight manner and a function as a valve member that controls a flow rate, and therefore the number of components can be reduced to reduce size and save space. Further, on the one end surface of the housing 411a, the diaphragm member 411b is integrally molded, and on the other end surface, the airtightness holding member 411c.3 is provided, so that airtightness inside the housing can be surely kept. Still further, the piezoelectric element 412 is configured to be able to be pushed or pulled by the adjustment screw 411c.2 through the airtightness holding member 411c.3, and therefore a position of the piezoelectric element 412 can be adjusted with the airtightness inside the housing being kept.

Note that the present invention is not limited to the above-described embodiment. For example, it is not necessary to make the pressure sensitive surface accurately parallel to the length direction and vertical to the component attachment surface, but even if the pressure sensitive surface is slightly tilted, the effect of making the width direction size smaller than before can be obtained.

Also, theoretically, the flow rate control valve can be provided on the downstream side of the pressure sensors, and if a pressure on a downstream or upstream side of the mass flow controller is in a constant state, it is not indispensable to provide a pair of pressure sensors, but only either one of them may be provided. Not only the mass flow controller, but the flow rate control valve and a pressure sensor provided on an upstream or downstream side of the flow rate control valve can also constitute a pressure controller.

Figure 11:
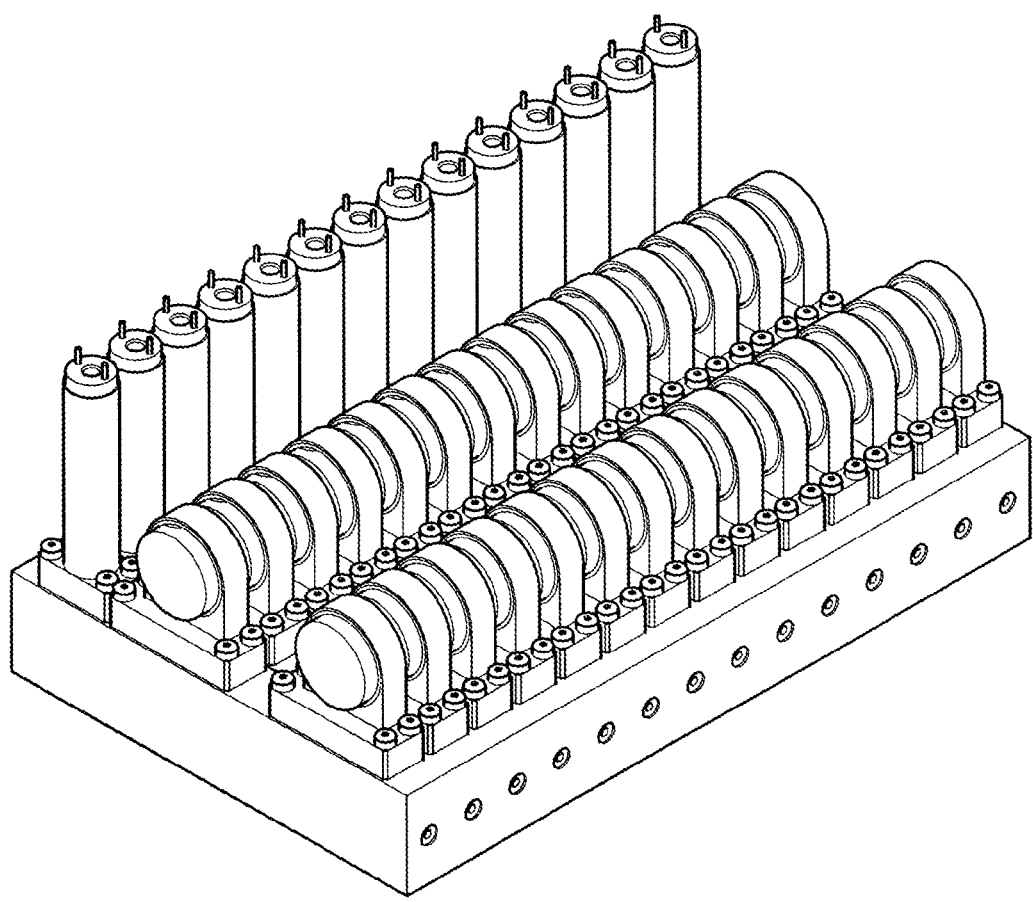
FIG. 11 is an overall perspective view illustrating a mass flow controller in another embodiment of the present invention.

Further, a plurality of body units may be arranged with side surfaces (surfaces parallel to the length direction) thereof being in close contact with or close to each other, and thereby a plurality of flow paths may be arranged in parallel. Also, in the case of arranging a plurality of flow paths in parallel as described, respective body units are not physically separated from each other, but, as illustrated in FIG. 11, may be formed as an integrally formed body unit union. In addition, in terms of the main purpose of the invention, even in this case, it should be considered that a body unit is present for each of the flow paths, and also it should be appreciated that a length direction of the body unit is a direction parallel to a flow direction of fluid in a plan view.

Besides, the present invention can be variously modified without departing from the scope thereof.

INDUSTRIAL APPLICABILITY

The present invention can provide a pressure sensor, a flow rate measuring mechanism, or a mass flow controller that can, without causing a reduction in pressure measurement sensitivity, make a width direction size dramatically smaller than before.

The invention claimed is:

1. A flow rate measuring mechanism comprising:
    a body unit that has an internal flow path through which a target fluid to be measured is configured to flow;
    a fluid resistance member is separating the internal flow path and has a resistance flow path that communicatively connects an upstream side internal flow path upstream of the resistance member and a downstream side flow path downstream of the resistance member; and
    a pressure sensor that is attached to the body unit and senses a pressure of at least one of the upstream side internal flow path and the downstream side internal flow path, the flow rate measuring mechanism being configured to calculate a flow rate of the fluid on a basis of the fluid pressure sensed by the pressure sensor, wherein:
        the body unit has a length direction and a surface parallel to the length direction, the surface being set as a component attachment surface, and to the component attachment surface, the pressure sensor is attached such that a pressure sensitive surface thereof is substantially vertical to the component attachment surface and substantially parallel to the length direction,
        a length direction size of the pressure sensitive surface is larger than a width size of the body unit at a largest width portion of the body unit, the width size being a size in a direction orthogonal to the length direction of the body unit, and
        an outer dimensional thickness size from one outermost surface to another opposite outermost surface of the pressure sensor in a direction parallel to a width direction of the body unit is set to be smaller than or the same as the width size of the body unit.

2. A mass flow controller comprising:
    the flow rate measuring mechanism according to claim 1;
    a flow rate control valve that is attached to the body unit; and
    a control circuit that controls the flow rate control valve so as to make a measured flow rate by the flow rate measuring mechanism equal to a predetermined target flow rate.

3. The flow rate measuring mechanism of claim 1, wherein the pressure sensor is configured to not protrude from the body unit in the width direction in an attached state.

4. The flow rate measuring mechanism of claim 1, wherein the body unit has two other side flat surfaces parallel to the length direction, the two other side flat surfaces configured to not attach with any components.

5. A flow rate measuring mechanism comprising:
    a body unit that has an internal flow path through which a target fluid to be measured is configured to flow;
    a fluid resistance member is separating the internal flow path and has a resistance flow path that communicatively connects an upstream side internal flow path upstream of the resistance member and a downstream side flow path downstream of the resistance member; and a pressure sensor that is attached to the body unit and senses a pressure of at least one of the upstream side internal flow path and the downstream side internal flow path, the flow rate measuring mechanism being configured to calculate a flow rate of the fluid on a basis of the fluid pressure sensed by the pressure sensor, wherein:

the body unit has a length direction and a surface parallel to the length direction, the surface being set as a component attachment surface; and to the component attachment surface, the pressure sensor is attached such that a pressure sensitive surface thereof is substantially vertical to the component attachment surface and substantially parallel to the length direction, a length direction size of the pressure sensitive surface is larger than a width size of the widest portion of a part of the body unit that the pressure sensor is attached to, the width size being a size in a direction orthogonal to the length direction of the body unit, and an outer dimensional thickness size from one outermost surface to another opposite outermost surface of the pressure sensor in a direction parallel to a width direction of the body unit is set to be smaller than or the same as the width size of the body unit.

* * * * *